US009647457B2

(12) United States Patent
Garcia et al.

(10) Patent No.: US 9,647,457 B2
(45) Date of Patent: May 9, 2017

(54) CONTROL DEVICE FOR DAMPING GRID OSCILLATIONS

(71) Applicant: VESTAS WIND SYSTEMS A/S, Aarhus N (DK)

(72) Inventors: Jorge Martinez Garcia, Aarhus N (DK); Florin Lungeanu, Egernsund (DK)

(73) Assignee: Vestas Wind Systems A/S, Aarhus N (DK)

( * ) Notice: Subject to any disclaimer, the term of this patent is extended or adjusted under 35 U.S.C. 154(b) by 604 days.

(21) Appl. No.: 14/347,991

(22) PCT Filed: Sep. 28, 2012

(86) PCT No.: PCT/DK2012/050366
§ 371 (c)(1),
(2) Date: Mar. 27, 2014

(87) PCT Pub. No.: WO2013/004252
PCT Pub. Date: Jan. 10, 2013

(65) Prior Publication Data
US 2014/0232198 A1 Aug. 21, 2014

(30) Foreign Application Priority Data

Sep. 30, 2011 (DK) .................................. 201170536

(51) Int. Cl.
*H02J 3/24* (2006.01)
*H02J 3/38* (2006.01)
(Continued)

(52) U.S. Cl.
CPC ............. *H02J 3/24* (2013.01); *F03D 7/0284* (2013.01); *F03D 7/0296* (2013.01); *F03D 7/048* (2013.01);
(Continued)

(58) Field of Classification Search
CPC ........................................................ H02J 4/00
(Continued)

(56) References Cited

U.S. PATENT DOCUMENTS

2005/0012339 A1   1/2005   Mikhail et al.
2009/0230681 A1   9/2009   Scholte-Wassink
(Continued)

FOREIGN PATENT DOCUMENTS

EP   1719910 A1   11/2006
EP   1816347 A1   8/2007
(Continued)

OTHER PUBLICATIONS

International Search Report for PCT/DK2012/050366, Sep. 5, 2013.
Danish International Search Report for PA 2011 70536, May 2, 2012.

*Primary Examiner* — Joseph Chang
(74) *Attorney, Agent, or Firm* — Patterson + Sheridan, LLP (57) ABSTRACT

The invention relates to a method for damping grid oscillations. The oscillations may be damped by controlling e.g. wind turbine generators to inject power to the grid in anti-phase with the grid oscillations. Instead of controlling one or more wind turbine generators to generate the same anti-phase power signal, a plurality of wind turbine generators are controlled so that each of them only generates a part of the anti-phase power signal, but so that all of the wind turbine generators in combination generates the entire anti-phase power signal.

14 Claims, 5 Drawing Sheets

(51) Int. Cl.
*F03D 7/02* (2006.01)
*F03D 7/04* (2006.01)

(52) U.S. Cl.
CPC ............ *H02J 3/38* (2013.01); *H02J 3/386* (2013.01); *F05B 2270/334* (2013.01); *F05B 2270/337* (2013.01); *Y02E 10/723* (2013.01); *Y02E 10/763* (2013.01); *Y10T 307/718* (2015.04)

(58) Field of Classification Search
USPC .............................................. 307/84; 290/44
See application file for complete search history.

(56) References Cited

U.S. PATENT DOCUMENTS

| | | |
|---|---|---|
| 2010/0052322 A1 | 3/2010 | Fortmann et al. |
| 2011/0109085 A1* | 5/2011 | Nelson ...................... H02J 3/24 290/44 |

FOREIGN PATENT DOCUMENTS

| | | |
|---|---|---|
| EP | 2182207 A2 | 5/2010 |
| WO | 01/93401 A1 | 12/2001 |
| WO | 2011/112571 A2 | 9/2011 |

\* cited by examiner

CONTROL DEVICE FOR DAMPING GRID OSCILLATIONS

FIELD OF THE INVENTION

The invention relates to damping of electrical oscillations of the utility grid.

BACKGROUND OF THE INVENTION

It is known that e.g. frequency and voltage of the electric power transmitted in the grid may start oscillating due to disturbances or bad control coordination between different generation units. It is also known that such oscillations in the grid may be counteracted or damped by injecting electric power with the right phase relative to the grid oscillations. However, injection of such electric power may excite mechanical resonances in the power generator device which produces the damping electric power.

Accordingly, it is a problem that when a power generator is controlled to damp grid oscillations vibrations in the power generator may inadvertently be excited.

SUMMARY OF THE INVENTION

In general, the invention preferably seeks to alleviate or eliminate the above mentioned problem relating to damping of grid oscillations. In particular, it may be seen as an object of the present invention to provide a method that solves problem of excitation of mechanical resonances in the power plant, or other problems of the prior art.

To better address one or more of these concerns, in a first aspect of the invention a control device for damping electrical grid oscillations in a utility grid is presented that comprises

- an input for receiving electrical parameters relating to the utility grid or for receiving a main damping reference signal determined for damping the grid oscillations,
- a processor for determining at least first and second reference signals from the input for controlling power generation of first and second power generator units connected to the utility grid for delivering power to the utility grid, where
    - the first and second reference signals are determined so that the power delivered to the grid by the first and second power generator units in combination enables damping of the grid oscillations, and where
    - the first and second reference signals each comprises an active part for causing a control effect on the respective first and second power generators and, successively to the active part, a passive part which does not cause a control effect, where the active parts of the first and second reference signals are separated in time.

The active parts of the first and second reference signals are separated in time and, therefore, the first and second reference signals can be defined so that the time separated active parts provides a damping effect of the grid oscillations. Since the active parts of each reference signal are succeeded by a passive part, the resonances that may be excited by the active part are able to at least partly decay during the period of the passive part. Thus, since the reference signals does not continuously provide a control effect and since the active parts are distributed among different reference signals it may be possible to damp grid oscillations without exciting major resonances in components of the power generator units.

It is understood that normally more than two references signals are determined for more than two power generator units. For example ten reference signals may be generated for e.g. ten different power generator units.

In an embodiment the electrical parameters comprises one or more of the following parameters, voltage, active or reactive current, active or reactive power, grid frequency and generator speed or load angle of a central generator connected to the utility grid. The load angle is defined as the angular displacement, at any specified load (real-power), of the centre line of a field-pole relative to the axis of the armature's magnetomotive force (mmf) wave pattern. The electrical parameters may be measured at a point of common connection on the grid, or other grid location. E.g. voltage parameters may be measured e.g. at the output of the power generator unit. The generator speed may be measured directly as the rotation speed of the generator. Alternatively, the electrical parameters may be estimated from other measured electrical values.

In an embodiment the first and second reference signals are determined from one or more of the electrical parameters so that the control effect of the active parts of the first and second reference signals counteracts an undesired oscillation in the one or more electrical parameters. For example the active parts may be determined so that the active parts from a plurality of reference signals together forms a variation in the injected electric power with the right phase relative to the grid oscillations in order to counteract the grid oscillation, where the grid oscillation is present in the electrical parameters.

In an embodiment the main damping reference signal comprises first and second active parts in succession where the first and second active parts are determined so as to counteract the grid oscillations given that the main damping reference signal was applied to the first or second power generating unit for controlling power generation, and

- the first and second reference signals are determined from the main damping reference signal so that the active part of the first reference signal is equivalent to the first active part of the main damping reference signal, and so that the active part of the second reference signal is equivalent to the second active part of the main damping reference signal.

Thus, instead of determining the reference signals from the electrical parameters, the reference signals may be determined directly from the main damping reference which may have been determined by another system or by the control device.

In an embodiment, for each of the first and second reference signals, the duration of the passive part is longer than the duration of the preceding active part. It may be an advantage that the passive part is longer than the active part so that resonances excited by the previous active part has sufficient time to decay during the passive part.

In an embodiment the processor is further configured to distribute the first and second reference signals among the first and second power generator units.

In an embodiment the processor is configured for determining three or more reference signals for controlling power generation of three or more power generator units, and to apply the reference signals to the power generator units cyclically. By applying the reference signals in turn, the active parts of the reference signals are applied in turn. Thereby, the duration of the passive part of each reference signal are equal and maximized with respect the number of reference signals.

In an embodiment the control device comprises an input for receiving vibration values indicative of a structural vibration state of each of a plurality of the power generator units, the processor is configured for determining three or more reference signals for controlling power generation of three or more power generator units, and the processor is configured to apply the reference signals to the power generator units in dependence of the structural vibration states of each power generator unit.

Thus, instead of applying the reference signals in turn, the reference signals may be applied so that e.g. a power generator unit having the lowest vibration amplitude will receive the reference signal. Thus, a structural vibration state may be a vibration amplitude.

In an embodiment the control device comprises an input for receiving an oscillation amplitude and an oscillation phase of a component of one of the power generator units, and the processor is configured to time the application of a reference signal to the power generator unit so as to counteract the oscillation defined by the oscillation amplitude and the oscillation phase.

Thus, the reference signal may be applied to a power generator unit so that the effect of the reference signal cause minimum excitation of resonances and possibly provides damping of existing resonances in a component of the power generator unit.

For example, the oscillation amplitude and the oscillation phase may be an oscillation amplitude and an oscillation phase of the tower of a wind turbine generator.

Alternatively, the oscillation amplitude and the oscillation phase is a generator speed of one of the power generator units. Since resonant vibrations of components of the power generator unit affect the generator speed, the generator speed can be processed to extract the oscillation amplitude and the oscillation phase of the resonant component.

In an embodiment the power generator unit is a wind turbine generator or a wind turbine generator plant.

As second aspect of the invention relates to wind turbine generator which comprises the control device according to the first aspect.

The control device for damping grid oscillations may be located within the wind turbine generator, but may alternatively be located elsewhere whenever the control device is able to receive e.g. electrical parameters relating to the grid oscillations and is able to transmit damping reference signals to individual power generator units.

Accordingly, the control device for damping grid oscillations may be part of wind turbine generator.

A third aspect of the invention relates to a method for damping electrical grid oscillations in a utility grid that comprises,
  receiving electrical parameters relating to the utility grid or for receiving a main damping reference signal determined for damping the grid oscillations,
  determining at least first and second reference signals from the input for controlling power generation of first and second power generator units connected to the utility grid for delivering power to the utility grid, where
    the first and second reference signals are determined so that the power delivered to the grid by the first and second power generator units in combination enables damping of the grid oscillations, and where
    the first and second reference signals each comprises an active part for causing a control effect on the respective first and second power generators and, successively to the active part, a passive part which does not cause a control effect, where the active parts of the first and second reference signals are separated in time,
  applying the reference signals to the first and second power generator units for damping the electrical grid oscillations.

In summary the invention relates to a method for damping grid oscillations. The oscillations may be damped by controlling e.g. wind turbine generators to inject power to the grid in anti-phase with the grid oscillations. Instead of controlling one or more wind turbine generators to generate the same anti-phase power signal, a plurality of wind turbine generators are controlled so that each of them only generates a part of the anti-phase power signal, but so that all of the wind turbine generators in combination generates the entire anti-phase power signal.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION OF EMBODIMENTS

Figure 1:
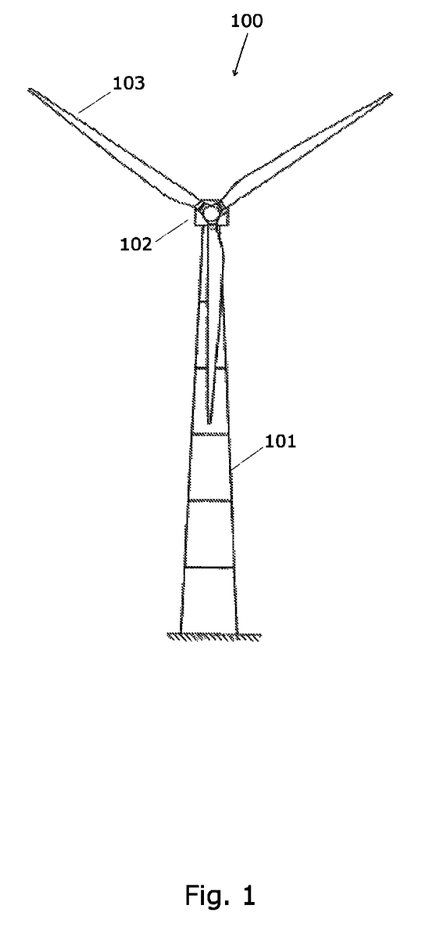
FIG. 1 shows a wind turbine generator 100.

FIG. 1 shows a wind turbine generator 100 comprising a tower 101 and a nacelle 102. The rotor assembly of rotor blades 103 is rotatable by action of the wind.

The wind induced rotational energy of the rotor blades 103 can be transferred via a shaft to a generator in the nacelle. Thus, the wind turbine generator 100 is capable of converting kinetic energy of the wind into mechanical energy by means of the rotor blades and, subsequently, into electric power by means of the generator.

The wind turbine generator can be connected to the grid for supplying the generated electric power to the grid.

It is known that e.g. frequency, voltage and current of the electric power transmitted in the grid may start oscillating due to disturbances. It is also known that such oscillations in the grid may be counteracted or damped by injecting a power signal into the grid with the right phase for counteracting the oscillations. In principle the damping power signal may be in anti-phase with the oscillations, although normally the damping signal is phase shifted relative to the principal anti-phase damping signal in order to generate the optimum damping.

Figure 2:
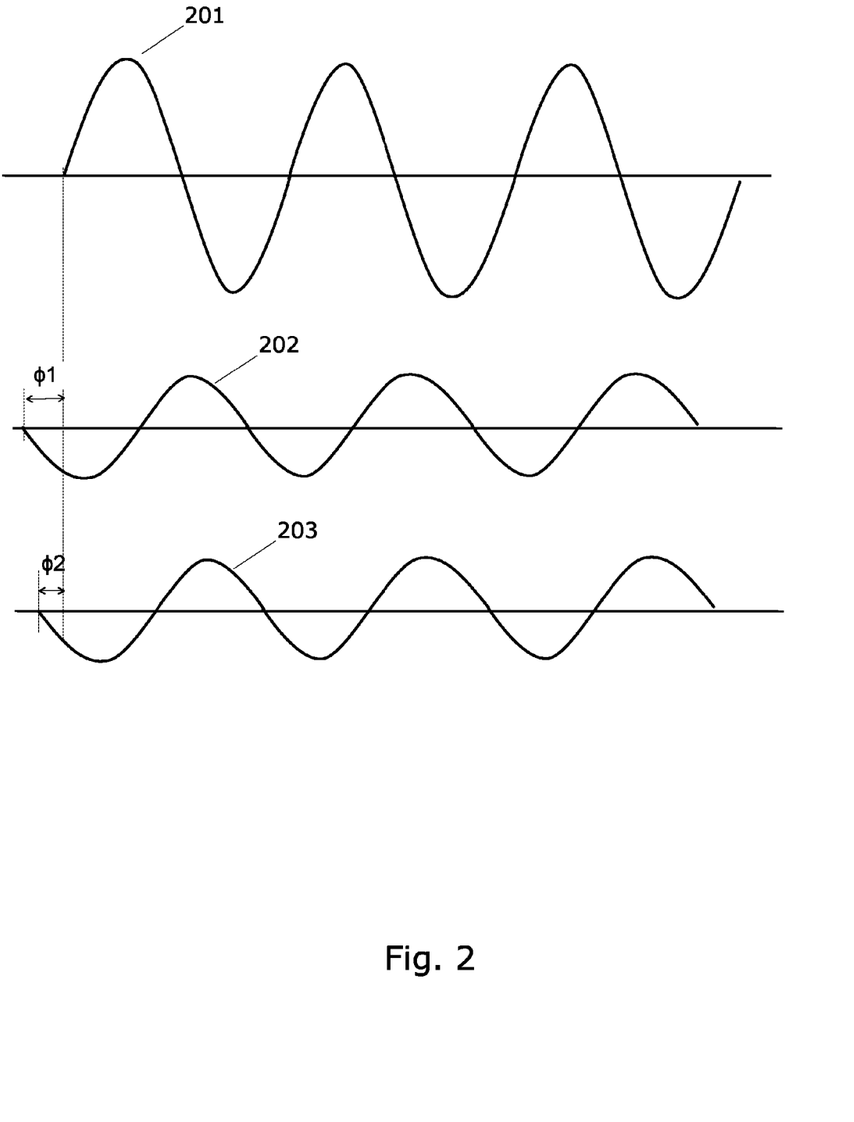
FIG. 2 illustrates an oscillation 201 in the utility grid.

FIG. 2 illustrates an oscillation in the grid, e.g. in the form of an oscillating voltage amplitude 201 (i.e. the sinusoidal peak amplitude or RMS amplitude). From a measurement of the grid oscillation 201 a power reference 202 for damping the oscillation can be generated. By supplying the power reference 202 e.g. to a wind turbine or a plurality of wind turbines electric power 203 is generated with the right phase with the grid oscillation and injected into the grid. As examples, oscillations in grid voltage or grid frequency can be damped by injecting electric power to the grid in anti-phase or with the undesired grid oscillations or having a particular phase relative to the undesired grid oscillations.

An explanation of why grid oscillations can be damped by injecting power to the grid is given here. If grid oscillations are present such as oscillations in grid frequency, then the speed of a main generator (e.g. the generator of a nuclear power station) is oscillating. By accelerating and breaking the generator at the right moments the grid oscillations can be damped. The breakings and accelerations of the main generator are done by changing the electrical torque experienced by the generator by injecting a damping power oscillation to the grid.

The power damping reference 202 may be determined on basis of a model of the power generator unit and the grid so that the power reference optimizes the damping of the grid oscillations. For example, the power damping reference 202 may be determined by determining a reference signal which when applied to the model optimizes the damping of the grid oscillations where the grid oscillations may be derived from the measured or estimated electrical parameters. The power damping reference can be determined by using the feedback of one or more signals from the grid, and processing them by a filter which will extract the oscillatory part of the grid feedback signals. Then the phase and magnitude of the damping reference signal is corrected according to the feedback signals and the control structure.

As shown in FIG. 2 the reference signal 202 and the phase shifted power signal 203 may not need to be exactly in anti-phase with the undesired oscillation 201, but may be phase shifted by $\phi 1$ and $\phi 2$ relative to the undesired oscillation in order to obtain the maximum damping effect.

When an oscillating power reference 202 is used for controlling the power production of e.g. a wind turbine, the reference signal may cause e.g. the blade pitch to adjust in order to adapt the power production to the power reference 202.

The adjustments of the pitch may inadvertently excite structural vibrations of different wind turbine components, e.g. vibrations of the blades 103, the shaft or the tower 101. Such excitation of vibrations is undesired since the vibrations may reduce the lifetime or damage components.

Other reference signals that the main power damping reference 202 may be used for controlling the amount of active and/or reactive power injected to the grid. For example, a current reference may be defined which when applied to the controller of e.g. a wind turbine generator affects the amount of power injected into the grid. Since different types of damping references 202 may be used for controlling the damping power injected to the grid, reference is generally made to a main damping reference 202 which could be main power damping reference 202, a current reference or equivalent reference signals.

Other power generator units than wind turbine generators may be power controlled for damping grid oscillations 201. Such power generator units may also have structures which inadvertently can be mechanically excited, such as the turbine shaft of thermal solar power plants or other de-central gas turbine plants. Therefore, such other power generator units may cause the same challenges as wind turbine generators with respect to minimizing excitation of structural vibrations. Since, wind turbine generators and other power generator units with turbine driven generators give the same challenges with respect to inadvertently excited mechanical resonances only wind turbine generators 100 or wind turbine plants are used as examples for general power generator units.

According to an embodiment of the invention, in order to reduce or avoid excitation of structural vibrations a plurality of individual reference signals for individual wind power plants are determined so that a single reference signal only causes an adjustment of the power generation of a single wind turbine generator for a limited period of time. Thereby, vibrations are only excited for a limited period of time and, consequently, it is avoided that vibration amplitudes increase due to continuous excitation. The plurality of reference signals are also determined so that when they are applied to a plurality of wind turbine generators they affect the power generation of wind turbine units in shift. Thereby, it is obtained that the damping effect on the grid of the plurality of individual reference signals corresponds to the damping effect of the single power damping reference 202.

Figure 3:
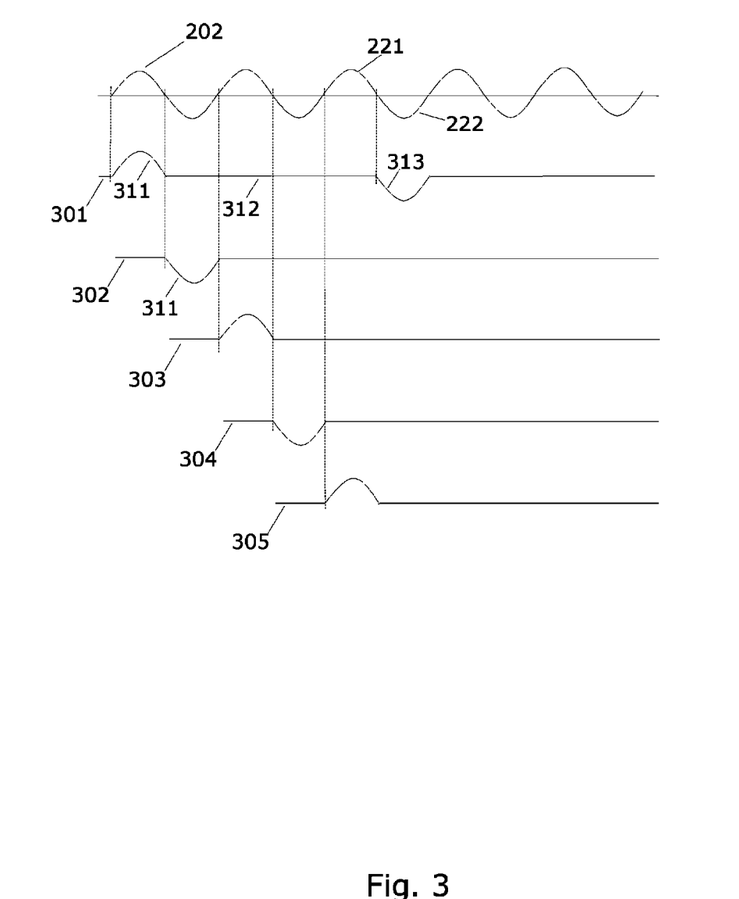
FIG. 3 illustrates determination damping reference signals from a main damping reference signal 202.

FIG. 3 shows how a plurality of individual reference signals 301-305 are determined from a main power damping reference signal 202. The individual reference signals 301-305 are determined by dividing succeeding half periods 221,222 of the main reference signal 202 into sub-signals which are assigned to one of the reference signals 301-305.

The succeeding half periods 221,222 of the main reference signal may also be referred to as active parts where the active parts are determined so as to counteract the grid oscillations if the main reference signal was applied to a wind turbine generator for controlling the power injected to the grid.

The individual reference signals 301-305, such as the first and second reference signals 301,302, each comprises an active part 311 which is the part, e.g. a half period, divided from the main reference signal 202, and a passive part 312 which succeeds immediately after the active part 311. Thus, the active part of the first reference signal 301 is equivalent to the first active part of the main reference signal 202, the active part of the second reference signal 302 is equivalent to the second active part of the main reference signal 202, and so forth.

The active part 311 causes a control effect on the wind turbine generator to which the reference signal 301 is applied to, whereas the passive part 312 does not cause a control effect on the wind turbine generator. The passive part may have a value of zero for the entire duration of the passive part.

The duration of the passive part 312 may depend on the number of individual reference signals 301-305. I.e. the more reference signals the longer duration of the passive part is possible. The half periods of the main power damping reference 202 may be distributed cyclically among the individual reference signals or the half periods may be distributed among the individual reference signals in dependence of other criteria, such as the vibration amplitude of components of the wind turbine generator.

Preferably, the duration of the passive part 312 is longer than the duration of the preceding active part 311 in order to ensure that vibrations that may have been excited by a first active part 311 of a first reference signal 202 is sufficiently decayed before the second succeeding active part 312 of the first reference is applied to a wind turbine generator.

The duration of an active part 311 of one of the individual signals is equal or substantially equal to the duration of the corresponding divided active part or half period of the main power damping reference signal 202

The duration of an active part 311, 313 may be substantially equal to half of the period of the grid voltage signal. Thus, if the frequency of the oscillations to be damped varies, the duration of the active parts 311, 313 may vary according to the actual frequency.

When the first to fifth reference signals 301-305 are applied to e.g. first to fifth wind turbine generators the variation in injected power to the grid from the first to fifth wind turbine generators is equivalent to the variation in injected power from a single wind turbine generator to which the main power damping reference 202 is applied. Accordingly, by dividing the main power damping reference signal 202 into individual reference signals 301-305 and by applying the reference signals to individual wind turbine generators, it is obtained that the power delivered to the grid by the individual wind turbine generators in combination enables damping of the grid oscillations as if the main power damping reference was applied to a single wind turbine generator.

The individual reference signals 301-305 may be determined directly from the main power damping reference 202 as described above. Accordingly, the individual reference signals 301-305 may be determined without measured or estimated electrical parameters relating to the utility grid, e.g. measured grid power values, if a main power damping reference 202 is available.

Alternatively or additionally, the individual reference signals 301-305 may be determined directly from the electrical parameters of the grid without initial determination of the main power damping reference 202. Since the individual reference signals 301-305 correspond to the main power damping reference 202, the individual reference signals 301-305 can be determined from the electrical parameters principally in the same way as the main power damping reference 202 would have been determined. Thus, the first to fifth reference signals 301-305 may be determined from one or more of the electrical parameters so that the control effect of the active parts of the first to fifth references counteracts an undesired oscillation in the one or more of the electrical parameters.

The electrical parameter relating to the utility grid may be a grid voltage, an active or reactive grid current, an active or reactive grid power or a grid frequency. The electrical parameter may also be a generator speed of a central electric power generator which delivers power to the utility grid. Such electrical parameters may be measured remote from the location of the control device for damping grid oscillations and remote from the power generating units.

Figure 4:
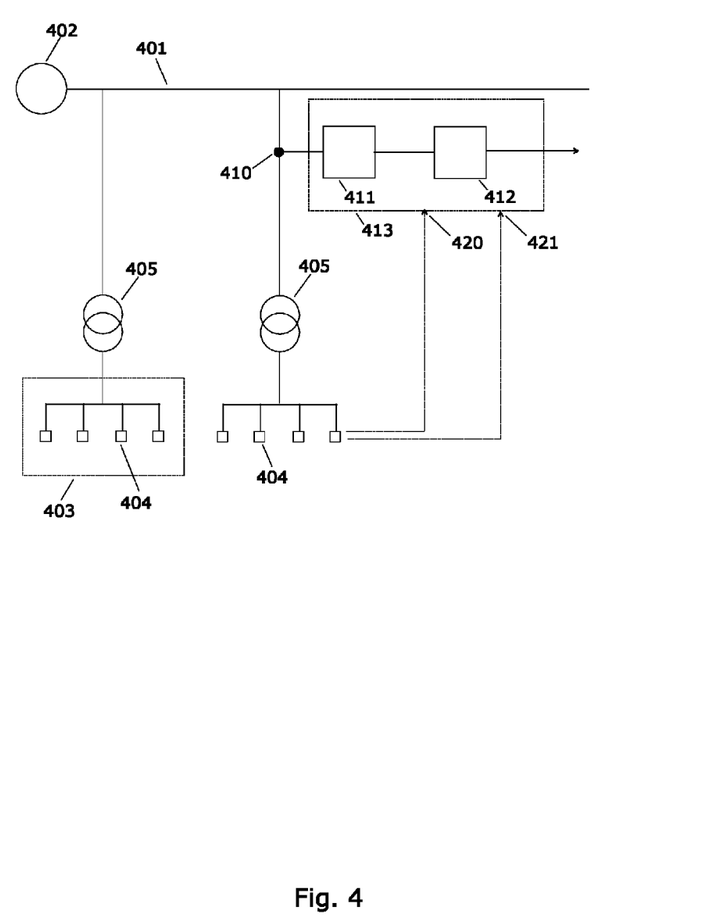
FIG. 4 illustrates a power transmission system comprising the main grid 401, power generator units 404 connected to the grid 401 and a control system 413 for damping grid oscillations.

FIG. 4 shows a generator 402—e.g. a generator of a nuclear power station—which supplies electric energy to a main grid 401. Power generator units 404, e.g. in the form of wind turbine generators, also supplies electric power to the grid via transformer stations 405. A plurality of power generator units 404 may be grouped in a power generator plant 403.

A power generator unit 404 may be a single wind turbine generator 404, a wind turbine plant 403, other individual power generator such as a thermal solar power generator, or a generator plant comprising a plurality of power generators.

A damping controller 411 is connected to the point of common connection 410, i.e. a point located at the grid side of the transformer stations 405, for determining a main power damping reference 202 from measured or estimated electrical parameters relating to the utility grid. I.e. from measured or estimated values of grid voltage, active or reactive grid current, active or reactive grid power, grid frequency or generator speed of the generator 402.

The determined main power damping reference 202 is supplied to a damping dispatcher 412 which determines individual damping references such as the first to fifth reference signals 301-305 from the main power damping reference 202, e.g. as described before by dividing the main power damping reference 202 into half periods 221,222 and defining individual references 301-305 from the half periods.

FIG. 4 illustrates one embodiment of a control device 413 of an embodiment of the invention where the control device 413 comprises both the damping controller 411 and the damping dispatcher 412. According to this embodiment, the control device 413 comprises an input for receiving measured or estimated electrical parameters relating to the utility grid, and an output for transmitting the determined reference signals 301-305 to power generator units 404 or a distributor for distributing the reference signals 301-305.

According to another embodiment the individual reference signals 301-305 are determined without use of measured or estimated electrical parameters relating to the utility grid, e.g. measured grid power values, but from a main power damping reference 202. In this embodiment of the invention the control device 413 comprises a processor for determining the reference signals 301-305 from the main power damping reference 202 (i.e. the processor is equivalent to the damping dispatcher 412), an input for receiving the main power damping reference 202 and an output for the determined reference signals 301-305.

According to yet another embodiment the individual reference signals 301-305 may be determined directly from the electrical parameters of the grid without initial determination of the main power damping reference 202. In this embodiment of the invention the control device 413 comprises a processor for determining the reference signals 301-305 directly from the electrical parameters of the grid as described above, an input for receiving the electrical parameters and an output for the determined reference signals 301-305.

Accordingly, the function of the processor depends on how the individual control references are determined. Accordingly, the processor is understood as a processor or control system capable of determining the individual reference signals 301-305 according to anyone of the three embodiments explained above, i.e. the processor may also be understood as being configured to carry out the function of the damping controller 411 and the damping dispatcher 412.

Figure 5A:
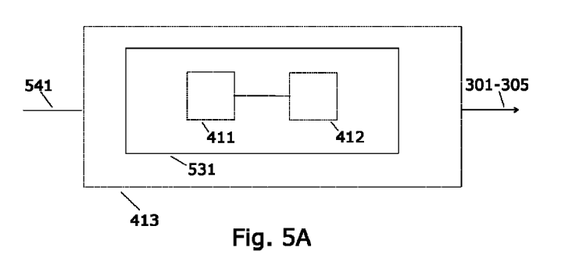
FIG. 5 shows different embodiments of a processor 531-533 for determining individual damping reference signals 301-305.
Figure 5B:
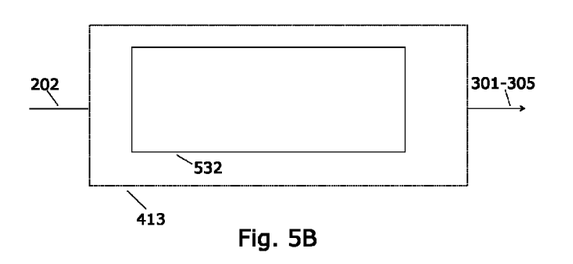
Figure 5C:
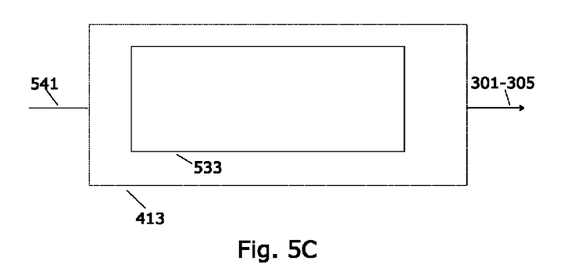

FIG. 5A-C illustrates three embodiments of the processor 531-533 of the control device 413. In FIG. 5A the processor 531 is equivalent to the damping controller 411 and the damping dispatcher 412 so that the individual reference signals 301-305 are determined from the electrical parameters 541. In FIG. 5B the processor 532 determines the individual reference signals 301-305 directly from a main power damping reference 202. In FIG. 5C the processor 533 determines the individual reference signals 301-305 directly from the electrical parameters 541.

The processor, e.g. the damping dispatcher 412, may further be configured to distribute the individual power damping reference signals 301-305 among the power generator units 404. Alternatively or additionally, the capability of distributing the individual reference signals 301-305 may be located in a separate dispatcher unit, e.g. at the location of a wind turbine plant. It is understood that the individual reference signals 301-305 may be applied to generator units 404 located in a single location, such as a single plant 403, or in different locations.

The control device 413, e.g. the processor, may be configured to apply the reference signals 301-305 to the power generator units 404 cyclically, e.g. so as to maximize the duration of the passive part of each reference signal.

In another embodiment, the control device 413 is configured to determine which power generator unit 404 will receive the next individual damping reference 301 or the next active part 311 in dependence of how much an element of a power generator unit vibrates. In this way it is possible to apply a damping reference signal to a power generator unit 404 having low oscillation amplitudes and, thereby, avoid further excitation of vibrations of a generator unit 404 wherein vibrations are relatively large, e.g. larger than a preset threshold.

According to this embodiment, the control device 413 may further comprise an input 420 for receiving vibration values indicative of a structural vibration state of each of a plurality of power generator units, and to apply or assign the reference signals to the power generator units in dependence of the structural vibration states of each power generator unit. A structural vibration state may comprise a vibration amplitude of an element of a power generator unit. The vibration state of a power generator unit may be measured or estimated by a sensor system of the power generator unit and transmitted to the control device 413.

The application of damping reference signals 301-305 to power generator units enables damping of grid oscillations 201 but may also excite structural vibrations of components of the power generator unit 404. However, it is possible to apply the damping reference signal 301-305, i.e. an active part 311, to a power generator unit 404 so that structural vibrations are damped or so that excitation of structural vibrations is minimized.

As an example, the shaft of a generator, e.g. the shaft connecting the blades of a wind turbine generator with the gearbox and, thereby, also the generator speed, may oscillate. The damping reference 301-305 can be applied so as to counteract the oscillation in the generator speed; e.g. if a half period of the generator speed increases then a damping reference signal 301-304 can be applied to counteract the increase of the generator speed and at the same time contribute to damping grid oscillations. As an example, by applying a damping reference signal 301-304—such as an active half period 311,312 which has the effect of decreasing power production and, thereby, generator speed—to a power generator unit 404 an increasing speed of the generator oscillation can be counteracted.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A control device for damping electrical grid oscillations in a utility grid, where the control device comprises:
   an input for receiving electrical parameters relating to the utility grid or for receiving a main damping reference signal determined for damping the grid oscillations,
   a processor for determining at least first and second reference signals from the input for controlling power generation of first and second power generator units connected to the utility grid for delivering power to the utility grid, where
   the first and second reference signals are determined so that the power delivered to the utility grid by the first and second power generator units in combination enables damping of the grid oscillations, and where
   the first and second reference signals each comprises an active part for causing a control effect on the respective first and second power generator units and, successively to the active part, a passive part which does not cause a control effect, where the active parts of the first and second reference signals are separated in time.

2. A control device according to claim 1, where the electrical parameters comprises one or more of the following parameters, voltage, active or reactive current, active or reactive power, grid frequency, load angle, and generator speed of a central generator connected to the utility grid.

3. A control device according to claim 1, where the first and second reference signals are determined from the electrical parameters so that the control effect of the active parts of the first and second reference signals are capable of counteracting an undesired oscillation present in the electrical parameters.

4. A control device according to claim 1, where
   the main damping reference signal comprises first and second active parts in succession, where the first and second active parts are determined so as to counteract the grid oscillations given that the main damping reference signal was applied to the first or second power generating unit for controlling power generation, and where
   the first and second reference signals are determined from the main damping reference signal so that the active part of the first reference signal is equivalent to the first active part of the main damping reference signal, and so that the active part of the second reference signal is equivalent to the second active part of the main damping reference signal.

5. A control device according to claim 1, where for each of the first and second reference signals, a duration of the passive part is longer than a duration of the preceding active part.

6. A control device according to claim 1, where the processor is further configured to distribute the first and second reference signals among the first and second power generator units.

7. A control device according to claim 1, where the processor is configured for determining three or more reference signals for controlling power generation of three or more power generator units, and to apply the reference signals to the three or more power generator units cyclically.

8. A control device according to claim 1, where
   the control device comprises an input for receiving vibration values indicative of a structural vibration state of each of a plurality of power generator units, where
   the processor is configured for determining three or more reference signals for controlling power generation of three or more of the plurality of power generator units, and where
   the processor is configured to apply the three or more reference signals to the three or more power generator units in dependence of the structural vibration states of the three or more power generator units.

9. A control device according to claim 1, where
the control device comprises an input for receiving an oscillation amplitude and an oscillation phase of a component of one of the power generator units, where
the processor is configured to time an application of a reference signal to the one or more power generator units so as to counteract an oscillation defined by the oscillation amplitude and the oscillation phase.

10. A control device according to claim 9, where the oscillation amplitude and the oscillation phase is an oscillation amplitude and an oscillation phase of a tower of a wind turbine generator.

11. A control device according to claim 9, where the oscillation amplitude and the oscillation phase is a generator speed of the one of the power generator units.

12. A control device according to claim 1, where at least one of the first and second power generator units is a wind turbine generator or a wind turbine generator plant.

13. A system, comprising:
a wind turbine generator, comprising:
a control device communicatively coupled to the wind turbine generator, the control device for damping electrical grid oscillations in a utility grid, the control device comprising:
  an input for receiving electrical parameters relating to the utility grid or for receiving a main damping reference signal determined for damping the grid oscillations; and
  a processor for determining at least first and second reference signals from the input for controlling power generation of first and second power generator units connected to the utility grid for delivering power to the utility grid,
  where the first and second reference signals are determined so that the power delivered to the utility grid by the first and second power generator units in combination enables damping of the grid oscillations; and where the first and second reference signals each comprises an active part for causing a control effect on the respective first and second power generator units-and, successively to the active part, a passive part which does not cause a control effect, where the active parts of the first and second reference signals are separated in time.

14. A method for damping electrical grid oscillations in a utility grid, where the method comprises:
receiving electrical parameters relating to the utility grid or for receiving a main damping reference signal determined for damping the grid oscillations;
determining at least first and second reference signals from an input for controlling power generation of first and second power generator units connected to the utility grid for delivering power to the utility grid, where
the first and second reference signals are determined so that the power delivered to the utility grid by the first and second power generator units in combination enables damping of the grid oscillations, and where
the first and second reference signals each comprises an active part for causing a control effect on the respective first and second power generators and, successively to the active part, a passive part which does not cause a control effect, where the active parts of the first and second reference signals are separated in time; and
applying the reference signals to the first and second power generator units for damping the electrical grid oscillations.

* * * * *